Patented Oct. 2, 1923.

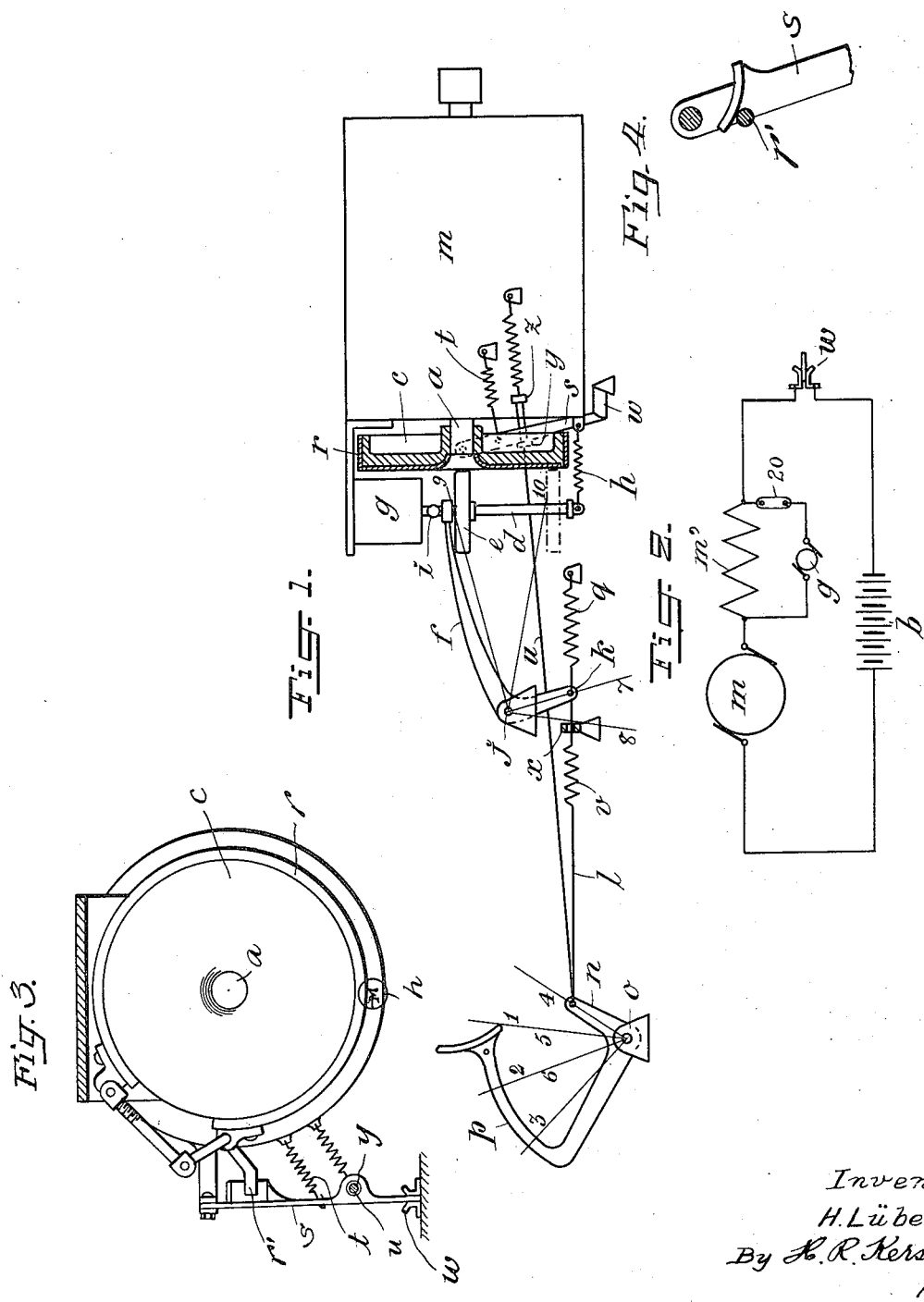

1,469,264

UNITED STATES PATENT OFFICE.

HILDING LÜBECK, OF HERSERUD, SWEDEN.

REGENERATIVE BRAKING SYSTEM FOR ELECTRICALLY-DRIVEN VEHICLES.

Application filed December 28, 1918. Serial No. 268,713.

*To all whom it may concern:*

Be it known that I, HILDING LÜBECK, subject of the King of Sweden, residing at Herserud, Sweden, have invented certain new and useful Improvements in Regenerative Braking Systems for Electrically-Driven Vehicles, of which the following is a specification.

The present invention relates to a method of utilizing the potential and kinetic energy of electrically driven vehicles, particularly such using storage batteries, in running downhill or in changing rapidly to a lower speed, by transforming said energy into electrical energy, for instance for charging the storage battery, whereby at the same time the braking of the vehicle is effected.

More particularly the invention relates to such known systems of this kind in which the driving motor may be made to act as a generator by connecting the field winding of the motor in parallel with a separate source of current supply for the purpose of obtaining suitable field-strength.

In a known system said source of current supply consists of a separate storage battery containing a few cells and having an adjustable resistance connected in series with it, and in another known system the source of current supply consists of a separate small motor-generator, the motor of which is driven from the main storage battery and the speed of which may be regulated by means of an adjustable resistance inserted in the motor circuit, the generator of said motor-generator being connected in parallel with the field winding of the driving motor.

According to the present invention a separate small generator is used as a source of current supply, said generator, however, as contrasted with systems previously known, being driven and regulated mechanically by means of any suitable transmission directly or indirectly connected with the shaft of the driving motor or a wheel axle of the vehicle.

The invention will be more clearly described with reference to the accompanying drawing. Fig. 1 shows diagrammatically an embodiment of an arrangement according to the invention, and Fig. 2 a circuit diagram showing the electrical connections between the main source of current supply, for instance a storage battery $b$, and the driving motor $m$ and between the generator $g$ and the field winding $m^1$ of the driving motor. Fig. 3 is a section through the apparatus taken in a plane between the generator $g$ and the disk $c$.

Fig. 4 is an enlarged fragmentary detail view of the lever $s$ showing the cam carried thereby.

In Fig. 1 $m$ is the driving motor and $g$ the generator. Fixed to the shaft $a$ of the driving motor is a brake disc $c$ the plane outer side of which is preferably formed to serve as a friction disc. The generator $g$ may be rigidly attached to the motor $m$ in any suitable way. Provided on an extension $d$ of the shaft of the generator is a slidable friction wheel $e$ which can be moved longitudinally on the said extension $d$ by means of a lever $f$, so as to be placed in different positions between the centre and the periphery of the friction disc. The friction wheel is held against the friction disc with a suitable pressure by means of a spring $h$.

The friction disc may suitably have a recess in its centre in order that the friction wheel shall not bear against the disc when in a position opposite to the centre of the disc. The shaft of the generator is preferably connected with the extension $d$ by means of a universal joint $i$. By displacing the friction wheel the generator may obviously at a certain speed of the driving motor be run at any speed between certain maximum and minimum limits. The lever $f$ is pivoted at $j$ and rigidly connected with the lever $k$ the latter being connected for instance by means of a rod or a wire $l$, with a lever $n$ which is pivoted at $o$ and rigidly connected with the pedal $p$. The friction wheel $e$ is held in neutral position by the spring $q$.

By electrical braking by means of the arrangement above described the speed of the vehicle may be slowed down till the vehicle runs very slowly when it may be stopped by means of a mechanical brake.

The mechanical brake may for instance be so arranged that a brake band $r$ acts on the brake disc $c$ on turning a lever $s$ connected with the lever $n$ of the pedal $p$ by means of the rod or wire $u$. When the lever $s$ is not actuated by the pedal $p$, it is held by a spring $t$ in such a position that the brake band $r$ is out of contact with the brake disc $c$. The rod $l$ is connected with a spring $v$ of such a tension that it is not materially stretched until the lever $k$ has been stopped by an abutment $x$. The rod $u$ has two collars $y$ and $z$ located on opposite sides of the lever $s$ and so arranged that the lever $s$ is not actuated by the bar $u$ on operating the pedal until the lever $k$ is stopped by the abutment $x$. By means of the lever $s$ and a switch $w$ the main circuit is opened before the brake band $r$ is applied to the brake disc $c$, and a suitable switch 20 is preferably interposed in the electrical connection between the field winding $m'$ of the driving motor $m$ and the generator $g$ for cutting the latter out of the main circuit during the periods when the motor $m$ is used for driving the car.

The electrical and mechanical brakes operate as follows:—

On pushing the pedal $p$ from position 1 to position 2 the lever $n$ is moved from position 4 to position 5, and the lever $k$ is actuated by the rod $l$ and the spring $v$ and moved from position 7 to position 8 in which it is stopped by the abutment $x$, the spring $v$ being then stretched only very little, and, further, the lever $f$ is moved from position 9 to position 10 the friction wheel $e$ being then moved from neutral position to the maximum speed position. The mechanical brake is not actuated at all on pushing the pedal from position 1 to position 2 but the collar $z$ is displaced to bear against the lever $s$ without yet operating the latter. On pushing the pedal from position 2 to position 3 the main circuit is first opened at $w$ by the lever $s$ and then the latter applies the brake band. The lever $k$ then remains in position 8, i. e., bearing against the abutment $x$ and the spring $v$ is stretched by the bar $l$ to the extent required for the lever $n$ to move from position 5 to position 6.

When the pedal $p$ is released the operations described take place in the reversed order. Thus, the lever $a$ is returned by the spring $t$ the brake band $r$ being then released from the brake disc $c$, and then the main circuit is closed at $w$. The lever $k$ is returned by the spring $q$ from position 8 to position 7, and the lever $f$ and the friction wheel $e$ are returned from position 10 to position 9. The friction wheel $e$ is then released from the friction disc $c$ by means of any suitable arrangement in order to be out of contact with the disc when the latter is at rest.

As seen from the above description, the means for operating the brakes are so devised that the mechanical brake will operate even if the electric brake is mechanically or electrically defective, as the spring $v$ always allows the pedal $p$ to be moved so far as to operate the lever $s$. It will be understood that under conditions of normal running, with the friction wheel $e$ at the center of the revolving friction disc $c$, said wheel will not revolve, and the generator $g$ will be out of action. When it is desired to brake the car, as in going down hill, or in slowing down, the friction wheel $e$ is moved to an eccentric position as described above, causing this wheel, and the generator $g$ connected with it, to be driven by the rotating disc $c$. However, under these circumstances, the power for rotating the disc $c$ is derived, not from the electric current furnished to the motor $m$, but from the potential or kinetic energy of the moving car, which energy or momentum tends to keep the car in motion. According to the position to which the wheel $e$ is shifted, the rotary speed of the generator $g$ will be greater or smaller, and the voltage furnished by this generator will increase gradually as the speed of the generator is increased by shifting the wheel $e$ towards the periphery of the driving friction disc $c$. In this way the voltage of the current furnished by the generator $g$ is increased gradually as the motor $m$ is slowing down, and by adding this voltage of the generator to that of the field of the motor $m$, the voltage of the said motor can be increased enough to overcome the voltage of the battery, so that the motor will return current into the battery, the motor acting as generator. The main circuit is not broken at the switch $w$ until the electrical braking action has progressed far enough to render it expedient to complete the braking action by the effect of the mechanical brake. Of course, at the time the mechanical brake comes into action, the electric circuit should be open.

It will be understood that the action of regeneration or recharging can take place only as long as the speed or momentum of the car is high enough to furnish the potential or kinetic energy required to run the motor (then acting as a generator) at a speed sufficient to bring the voltage of the current thus generated above the voltage of the battery. It is well-known that a regenerative or recharging action of this general character has a braking effect on the car.

The invention is not limited to the shown arrangement for effecting a variable transmission from the shaft of the motor $m$ to the shaft of the generator $g$ as the transmission, evidently, may be effected in other ways, for instance by means of beveled rollers connected by a belt, or by means of gearings, etc. Also other parts may be constructed in many different ways.

The arrangement may also be used, suitably modified, when several motors are used on the vehicle.

The method of braking by applying an electrical and a mechanical brake after one another may, evidently, also be used in connection with other regenerative systems than that above described, for instance in connection with systems in which the energization of the motor is effected by means of a separate battery or a motor-generator.

Although the invention is chiefly intended for motor cars it is evident that it may be applied also to other electrically driven objects where a regeneration of electrical energy can be effected by the motor being connected as a generator, for instance lifts, cranes or the like.

I claim:—

1. In a regenerative braking system for electrically driven vehicles the combination with the driving motor, of a generator connected across the field winding of the motor and means for mechanically driving said generator from the shaft of the motor, said means comprising a variable transmission device for varying the speed of the generator.

2. In a regenerative braking system for electrically driven vehicles the combination, with the driving motor and a source of current supply therefor, of a generator connected in parallel with the field winding of the motor, for causing said motor to act as a generator, a mechanical brake, a common controlling device for said generator and brake mechanically connected with the mechanical brake and means for operating the generator and the brake, one after another, by means of said controlling device, the generator being first brought into operation and then the mechanical brake.

3. In a regenerative braking system for electrically driven vehicles the combination, with the driving motor and a source of current supply therefor, of a generator connected in parallel with the field winding of the motor, for causing said motor to act as a generator, a mechanical brake, a common controlling device for said generator and brake mechanically connected with the mechanical brake and means for operating the generator and the brake after one another by means of said controlling device, said means being arranged so as to allow the mechanical brake to be operated even if the generator be out of operation.

4. In a regenerative braking system for electrically driven vehicles the combination with the driving motor, of a generator connected across the field winding of the motor, means for mechanically driving said generator from the shaft of the motor, a variable transmission device for varying the speed of the generator and means for operating said transmission device consisting of a brake operating lever, and a mechanical brake operable by said brake operating lever.

5. In a regenerative braking system for electrically driven vehicles the combination of an electric brake consisting of the driving motor and a generator connected across the field winding of the motor, a variable mechanical transmission for driving said generator from the shaft of the motor, a mechanical brake, a brake operating lever, means for operating said brakes after one another by means of said brake operating lever the electric brake being first brought into operation and then the mechanical brake.

6. In a regenerative braking system for electrically driven vehicles, the combination with the driving motor, of a generator connected across the field winding of the motor, means for mechanically driving said generator from the shaft of the motor, a variable transmission device for varying the speed of the generator, means for operating said transmission device consisting of a pedal, and a mechanical brake operated by said pedal.

In testimony whereof I affix my signature in presence of two witnesses.

HILDING LÜBECK.

Witnesses.
ALBERT K. PARKER,
HELEN LORIA.